Sept. 11, 1962 G. A. KENDALL 3,053,526
DAMPERS AND DAMPED SPRINGS
Filed Dec. 31, 1958 3 Sheets-Sheet 1

INVENTOR.
GILES A. KENDALL
BY
R. E. Geaugue
Attorney

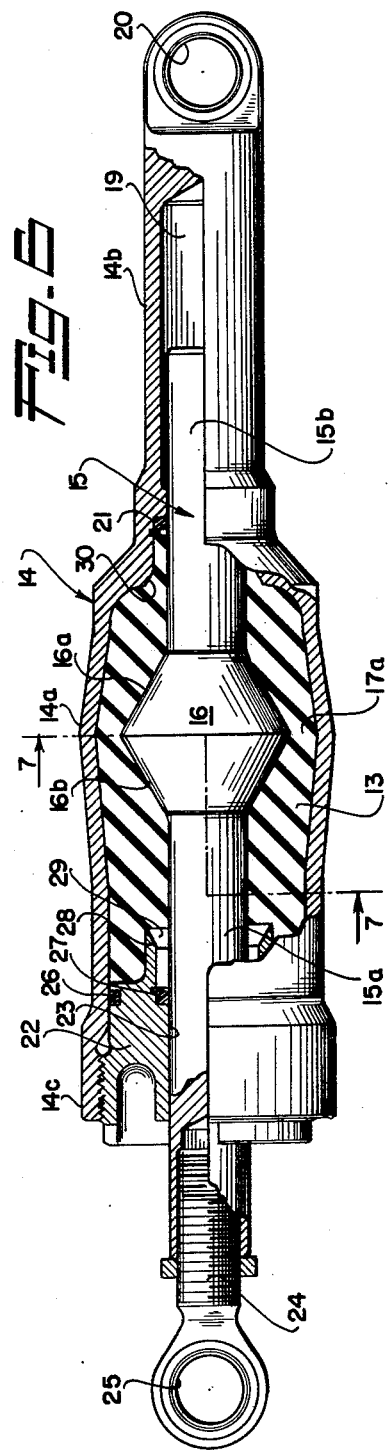
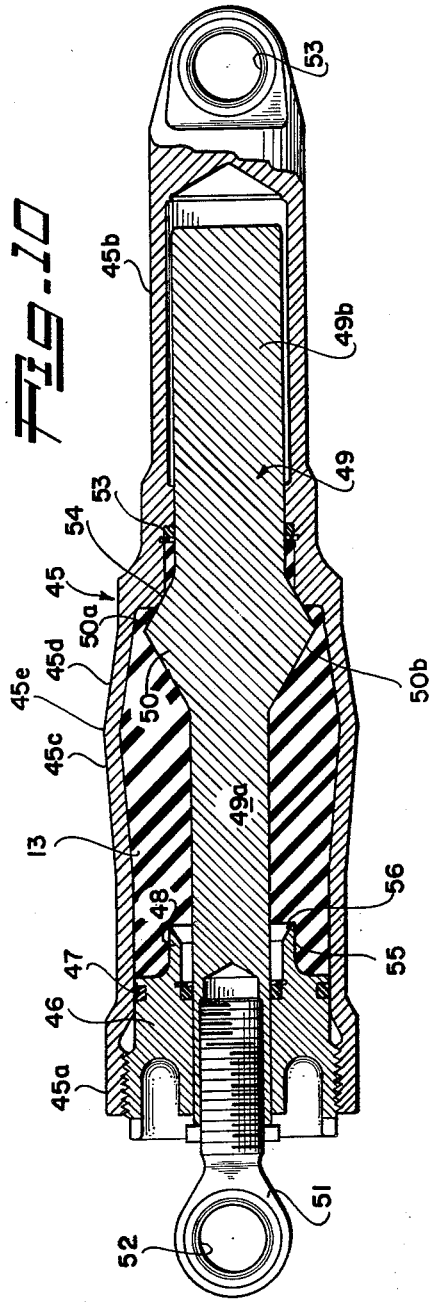
INVENTOR.
GILES A. KENDALL
BY R.E. Jeangue
Attorney

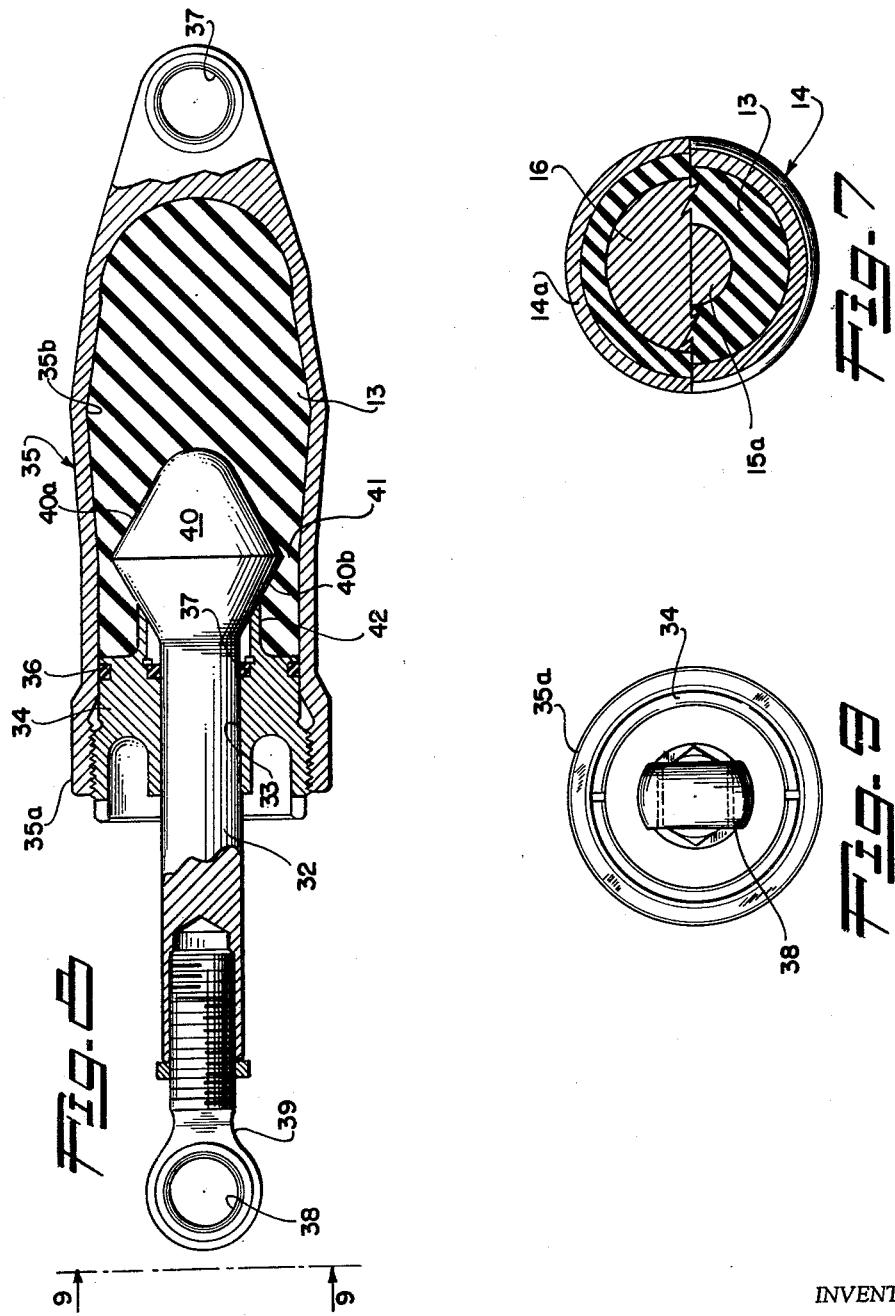

3,053,526
Patented Sept. 11, 1962

3,053,526
DAMPERS AND DAMPED SPRINGS
Giles A. Kendall, Van Nuys, Calif., assignor to Menasco Manufacturing Company, Burbank, Calif., a corporation of California
Filed Dec. 31, 1958, Ser. No. 784,384
5 Claims. (Cl. 267—1)

This invention relates to dampers and damped springs and more particularly to an apparatus and method for obtaining damping action and damped spring action by utilizing compressible solids as the working medium.

At the present time, liquids are utilized as the damping medium in various types of dampers and since liquids do not have shear strength, only damping as some function of velocity is available from these devices. Also, liquids are utilized as the working medium for springs and these spring devices depend upon the compressibility of the liquid. The present invention contemplates the use of compressible solids, instead of liquids or other fluids, in standard damper and damped spring constructions. Since compressible solids have a shear strength which is not a characteristic of liquids, it is possible to easily achieve various types of damping which are not available from the use of liquids. For instance, with the use of compressible solids, friction damping, viscous damping and exponential velocity damping can all be obtained from the action of the compressible solid on a movable shaft or piston and from the plastic flow of the solid through an orifice, whereas with the use of a liquid, only viscous and exponential velocity damping through an orifice can be obtained.

Friction damping results from friction existing between the movable member of the damper and the solid, and this friction damping is independent of the velocity of movement of the member. Viscous damping results from the shearing of the compressible solid at the surface of the movable member when the solid is at or above a certain pressure, and this shear damping is directly proportional to velocity. Also, by the use of an orifice in the damper, it is possible to obtain exponential velocity damping resulting from acceleration of the compressible solid through the orifice.

The use of a compressible solid as the damping and spring medium also provides certain structural advantages over the use of a liquid, in that the compressible solid does not present the leakage problem encountered with liquids. Also, a compressible solid produces a static damping and spring force which must be overcome by a finite external force before movement can result relative to the solid medium. In the damper springs, a net reduction in internal volume results from relative movement of the member and the compressible solid always provides an extending static force. In both dampers and damped springs it is possible to vary the types of forces by varying the physical dimensions of the device and by varying the characteristics and pressure of the compressible solid utilized as the working medium.

It is therefore an object of the present invention to provide a method of producing a damping force or a damped spring force by utilizing a confined compressible solid as the working medium.

Another object of the invention is to provide a damper or damped spring utilizing a compressible solid as the working medium and in which sealing is required only to prevent extrusion of the solid.

Another object of the invention is to provide a method for producing a desired combination of various types of damping forces, separately or together with spring forces, by selecting the physical dimension of a device and the characteristics of a compressible solid utilized as the working medium.

A further object of the invention is to provide a damper or damped spring utilizing a compressible solid as the working medium and requiring a finite force to initiate relative movement of the components of the device.

These and other objects of the invention not specifically set forth above will become readily apparent from the accompanying description and drawings, in which:

FIGURE 6 is a vertical section of a damper having an enlarged piston to define an orifice with the casing of the device;

FIGURE 7 is a vertical section along line 7—7 of FIGURE 6 illustrating the contour of the piston head and cylinder;

FIGURE 8 is a vertical section of a damped spring having an enlarged head movable into a volume of compressible solid;

FIGURE 9 is an end elevational view along line 9—9 of FIGURE 8; and

FIGURE 10 is a vertical section of another form of damped spring having piston rods of different diameters.

Figure 1:
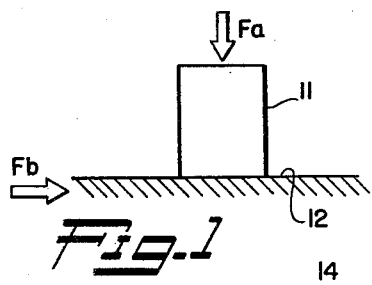
FIGURE 1 is a simple diagrammatic illustration of the forces involved when moving one solid relative to another.

Referring to the illustration of FIGURE 1, a solid body 11 is located upon a solid surface 12, and the force $F_a$ represents the force by which these bodies are forced together. If the force $F_b$ required to move the body 11 is less than the shear strength of the material of the body 11, then only frictional resistance will be encountered between the surfaces of the two bodies. However, if the force $F_b$ required to move the body 11 is greater than the shear strength of the material, then the material will fail in shear along the surface 12. It is therefore apparent that the pressure of the compressible solid in a confined body will determine whether frictional or viscous damping will be developed on a member movable within the solid.

Figure 2:
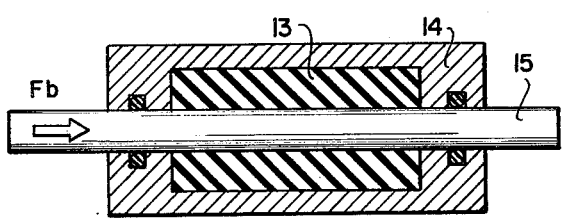
FIGURE 2 is a diagrammatic illustration of a damper having a damper rod of uniform diameter movable through a volume of a compressible solid at a selected pressure.

This principle is applied to the simple rod damper illustrated in FIGURE 2. In this illustration, a compressible solid 13 is located within a casing 14 and a rod 15 of uniform diameter is movable through the solid. If the pressure of the solid medium within the container 14 is such that the force $F_b$ required to move the rod is less than the shear strength of the medium in contact with the rod 15, then simple friction damping will result from movement of the rod 15 through the medium and this damping force will be independent of the velocity of the rod. However, if the pressure of the compressible solid 13 is high enough, the force $F_b$ required to produce motion of the shaft 15 will equal the shear strength of the medium in contact with the rod surface, and shearing of the medium will take place at the surface of the rod. Under this condition, straight shear or viscous damping will result and this damping will be directly proportional to the velocity of movement of the rod 15. In the case of friction damping, the damping will be a function of the coefficient of friction between the rod and the medium and in the case of shear damping, it will be a function of the shear strength of the medium. If the compressible solid were replaced with a liquid only viscous damping would be possible since surface friction is a unique characteristic of solids.

Various compressible solids could be utilized in the space within casing 14, such as silicone rubbers (silastics) or other silicon base solids, natural or synthetic rubber compounds, metallic sodium, potassium, ceasium, or lithium. The silicone rubbers are produced from dimethyl polysiloxanes in which various vulcanizing agents are incorporated to obtain various degrees of hardness and thereby various degrees of shear strength. The mark "Silastic" is the trade name for the silicone rubbers produced by Dow Corning, and these rubber products are available in a wide range of unit shear strength and compressibility.

For the purposes of the present invention, a compressible solid is defined to be such materials as do not change dimensionally under a 1 G stress loading. Of course, any solid to be compressible must be able to accomplish a change in volume, and every substance is compressible to some extent. In addition, it is understood that all solids will flow plastically when subjected to a high enough pressure. As referred to herein, plastic flow of a compressible solid means that flows which results when the solid is subjected to high enough pressure to produce a permanent change in the relationship of the molecules, similar to the change which results in a fluid passing through an orifice. For instance, sufficient pressure can be developed locally in a solid at a location adjacent an orifice to cause the solid to flow plastically through the orifice, with a resulting permanent change in relationship of the molecules during the plastic flow.

Figure 2A:
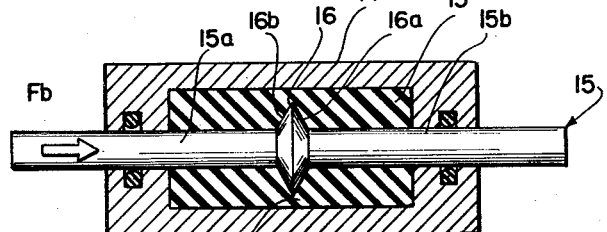
FIGURE 2a is a diagrammatic illustration of a damper similar to FIGURE 2 and having a piston head on the damper rod.

Referring to FIGURE 2a, a damper system similar to that shown in FIGURE 2 is illustrated wherein the rod 15 carries an enlarged head 16 which forms an orifice space 17 with the side walls of the casing 14. With the addition of the head 16 to the rod 15, damping forces in addition to the frictional or viscous damping forces on the rod portions 15a and 15b are accomplished. Movement of the head 16 requires that the compressible solid must flow through the orifice 17 and such flow requires acceleration of the solid material so that exponential velocity damping results. The force required to produce the plastic flow of the solid through the orifice is felt by the piston 16 and is equal to the force required to accelerate the material. As is apparent, this damping force is similar to the exponential velocity damping which would result from the movement of the head through a liquid. Another damping characteristic also results from movement of the head 16 in that a part of the solid which is accelerated through the orifice 17 will shear relative to the surface of the head 16 to provide an additional shear damping force even when the pressure of the solid produces only friction damping along the portions 15a and 15b of the rod 15. Shear damping results along surface 16a of the head 16 from the fact that the pressure of the compressible solid is increased along the orifice in the manner illustrated by the curve 18. Because of this increased pressure, shear damping rather than friction damping results from the movement of the compressible solid over the surface 16a of the head 16.

It is of course apparent that if the diameter of the head 16 is reduced, the exponential velocity damping would decrease and also, if the angle of the surface 16a were reduced, the shear damping could change to friction damping over the surface 16a because the increase in pressure at the surface would not be enough to result in shear of the solid adjacent the surface 16a. In addition to frictional or shear damping on rod portions 15a and 15b and on head surface 16a and in addition to the exponential velocity damping resulting from plastic flow through orifice 17, another force is developed to resist movement of head 16 through the solid medium 13. This additional force results from the pressure differential developed across the head 16 because the pressure on the side 16a which is entering the solid is greater than on the side 16b to which the solid is flowing.

In summary, if the pressure of the compressible solid 13 within the casing 14 is low, friction damping will result on shaft portions 15a and 15b and either friction or shear damping can result on the surface of piston 16 entering the solid. Also, exponential damping results from the plastic flow through the orifice 17 and a damping force is produced because of the difference in pressures developed on the opposite sides of the piston 16. If the pressure of the compressible solid within casing 14 were great enough to produce shear damping on the portions 15a and 15b, then the types of damping would be the same except for this change in damping function along the shaft. Each of the four damping forces listed above can be varied to obtain a desired combination thereof. For instance, the exponential velocity damping can be varied by varying the shear strength of the medium, the exposed area of the piston, the shape of the piston and the orifice area. Also, the shear damping developed along the entering side of the piston and the pressure differential across the piston can be varied by changing the shape of the piston. Thus, the damping device of FIGURE 2a can incorporate both frictional, viscous and exponential velocity damping as well as a differential pressure across the piston, and any desired combination of these damping factors can be produced.

A physical form of a damper incorporating the elements of FIGURE 2a is illustrated in FIGURES 6 and 7. The portion of casing 14 adjacent point 14a is progressively enlarged to form a variable orifice 17a which varies in area with the position of the head 16. The casing 14 has an extension 14b containing an opening 19 which receives the portion 15b of the rod 15, and the end of the extension 14b contains a fitting opening 20 to permit attachment of one of the relatively movable members between which the damping force is to be applied. Also, the casing 14 has a sealing ring 21 which is held in place by a snap ring to prevent extrusion of the compressible solid 13 into the opening 19 of extension 14b. The other end 14c of the casing is threaded to receive a gland 22 and this gland contains a central opening 23 for the portion 15a of the shaft. The end of portion 15a is threaded to receive a lug 24 which contains a fitting opening 25 for attachment to the other relatively movable member on which the damper acts. Sealing rings 26 and 27 are provided in gland 22 to prevent extrusion of the compressible solid 13 past the gland, and the pressure of the compressible solid 13 within the casing 14 is varied by screwing down the gland 22 until a desired degree of static pressure is achieved. An extension 28 of gland 22 has an angular surface 29 of the same slope as the side 16b of head 16, and a similar angular surface 30 of casing 14 is located on the opposite side of the head 16, and these surfaces 29 and 30 serve as stops for the head 16.

It is apparent that movement of the head 16 to the right in FIGURE 6 and relative to the casing 14, will produce the various damping forces discussed in connection with FIGURE 2a and that the type of damping acting on rod portions 15a and 15b will be determined by the pressure of the solid medium. Also, it is apparent that the shape of the casing 14 can be profiled in any desired manner relative to the head 16 to produce any desired area change between the head 16 and the inside diameter of the casing 14. This provides a method of controlling the reactive forces of the unit as a function of the displacement of the head 16 relative to the casing 14. Since the portions 15a and 15b of shaft 15 are of equal diameter, the movement of the head 16 has no overall effect on the net volume of the compressible solid 13. Selecting the correct combination of component variables, the damper of FIGURE 6 may be constructed to give a specific degree of damping. The variables which may be controlled to give the desired damping characteristics are compressibility of the solid medium, shear strength of the medium, volume of the medium, area of the piston rod, area of the piston head, area of the orifice, the shape of the piston head and the static pressure of the compressible solid 13. As previously discussed, the types of damping which may be produced with this type of unit are frictional, proportional to velocity and proportional to the velocity to some exponential power or any combination of them.

Figure 3:
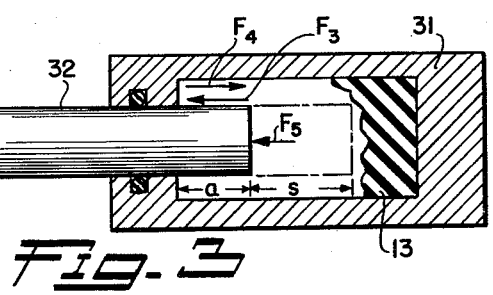
FIGURE 3 is a diagrammatic illustration of a damper spring in which a rod of uniform diameter is moved into a confined volume of a compressible solid.

Utilization of the compressible solid in a damped spring is illustrated in FIGURE 3 wherein the compressible solid 13 is contained within a casing 31 and a rod 32 of uniform diameter projects into the solid medium through one end of the casing 31. It is apparent that movement of the rod 32 into the casing 31 will result in reduction of the internal volume of the compressible solid 13 with a corresponding increase in internal pressure in some nonuniform manner. This increase in internal pressure results in a static force tending to extend the rod 32 out of the cylinder and whether or not the rod will move under these conditions depends upon the static forces present on the rod to resist this movement. In other words, after the piston rod 32 has moved the distance "s" into the casing 31, there will be a return force acting on the end area of the rod and developed by the increase in internal pressure in the casing 31. However, there will also be frictional or shear damping along the circumferential surface of the rod and if the effect of this damping force is greater than the force on the end of the piston, the piston will not return. If this damping force is less than the spring force, the piston will return as under the effect of a normal spring.

The damped spring of FIGURE 3 is peculiar in that it always has a static force resisting movement of the rod 32 in either direction and a finite force is required to cause movement of the rod in either direction. From the previous description, it is apparent that the forces resisting inward movement of the rod 32 are the following:

(a) The pressure of the solid medium working against the end area of the rod.

(b) The exposed piston area subject either to friction or shear damping, depending on the pressure of the solid medium.

Since the pressure of the medium increase as a function of the movement of the piston inwardly, the spring force will increase with displacement and as the piston reduces the volume more and more, the damping on the exterior circumferential surface of the rod can change from frictional damping to shear damping. Also, this circumferential area increases as the rod moves inwardly so that the total damping forces change with penetration of the rod. It is therefore apparent that the return force on the piston is proportional to the internal pressure, and that this return force is resisted by the damping force on the rod. If the spring return force is greater than the damping force, then the device of FIGURE 3 will act as a spring. However, if the damping force is greater than the spring force, the device of FIGURE 3 will act as a damper in which the damping would be less in the return direction than in the extended direction.

In FIGURE 3, the force $F_1$ is defined to be the force to produce a displacement "s" of the piston moving into the medium, and the force $F_2$ is defined to be the force required to resist the movement of the piston out of the medium over the stroke "s." Assuming that there is no volumetric change due to cylinder breathing, as well as no change in the shear strength of the medium or in the coefficient of friction of the medium with change in pressure of the medium, it can be shown that the forces $F_1$ and $F_2$ are as follows when forces $F_3$ and $F_4$ are a function of the coefficient of friction of the medium:

$$F_1 = \pi DP\left(\frac{D}{4} + (s+a)\mu\right)$$

$$F_2 = \pi DP\left(\frac{D}{4} - (s+a)\mu\right)$$

where the remaining terms are defined as follows:

$D$ = rod diameter (in.)
$a$ = length (in.) of engagement of rod in medium when P is zero
$P$ = solid medium pressure (p.s.i.)
$Vo$ = medium volume (IN³) when P is zero
$Vp$ = medium volume (IN³) at pressure P
$\mu$ = coefficient of friction, rod to medium When the forces $F_3$ and $F_4$ are a function of the shear strength of the medium, then the equations are as follows:

$$F_1 = \pi D\left(\frac{DP}{4} + \alpha(s+a)\right)$$

$$F_2 = \pi D\left(\frac{DP}{4} - \alpha(s+a)\right)$$

where $\mu$ = shear strength of medium (p.s.i)

Figures 4, 5:
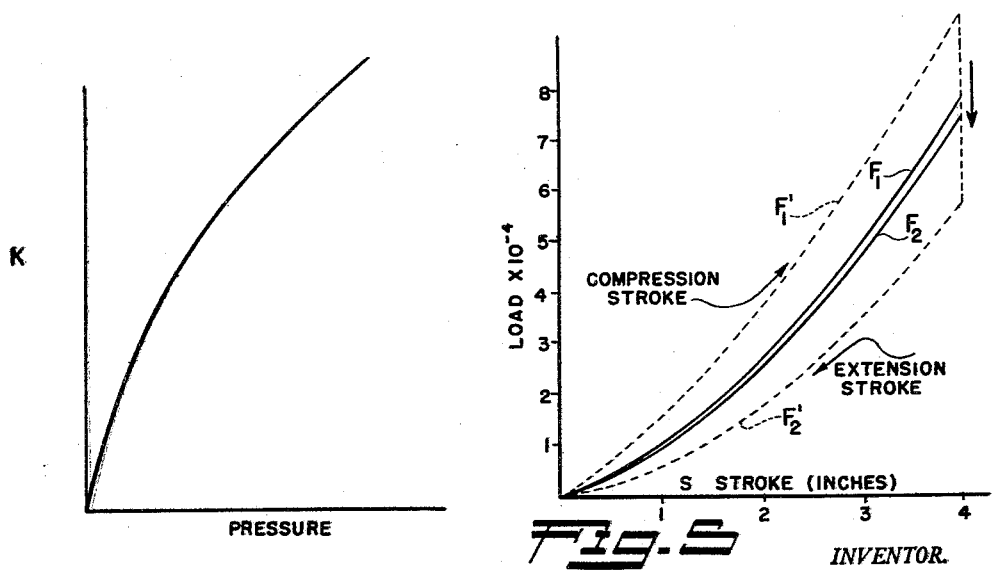
FIGURE 4 is a curve showing the relationship of the compressibility factor K of a given compressible solid to the pressure of the solid.
FIGURE 5 is a graphical illustration of the force $F_1$ required to move the piston of FIGURE 3 into the compressible solid and of the force $F_2$ required to resist the extending force of the piston.

The compressibility factor K for any particular material is defined as $$\frac{Vo - Vp}{Vo}$$

and from test data, it has been determined that K is a function of the instantaneous pressure P within the cylinder 31, such as represented by the curve of FIGURE 4. For any position of the rod 32 along the stroke S, the corresponding pressure can therefore be obtained from the relationship between P and K. Utilizing the above equations and the relationship between P and K, it is possible to plot the forces $F_1$ and $F_2$ as a function of the stroke position of the rod 32. The plot of FIGURE 5 is a plot of forces $F_1$ and $F_2$ as a function of stroke based on the following example and on the curve of FIGURE 4.

*Example*

$D = 1.5$ $\mu = .8$
$a = 0$ $\alpha = 50$
$Vo = 50$ $S = 4.0$ max.

In the subject example, shear damping comes in operation after about one half inch of stroke so that frictional damping is not involved over a major part of the stroke. Corresponding curves $F_1$ and $F_2$ can be determined for a wide variety of compressible solids having different coefficients of friction, shear strength and compressibility. For instance, the curves $F_1'$ and $F_2'$ result from a compressible solid in which $\alpha$ is 1000 and $\mu$ is .8. Through actual test of silicone rubbers in the mechanism of FIGURE 3, it has been determined that suitable damped springs can be produced from silicone rubbers having a range of unit shear strength between 20 p.s.i. and 80 p.s.i. Also, from actual test results, it appears that material shear strength between $10^{-2}$ and $10^4$ can be utilized.

A construction similar to FIGURE 3 is illustrated in FIGURE 8, wherein the piston rod 32 is slidable in opening 33 within gland 34. The gland is threaded to casing 35 at end 35a and sealing rings 36 and 37 prevent extrusion of the solid medium 13 past the gland. The compressible solid 13 is contained within casing 35 and casing 35 has a length of varying internal diameter at section 35b. A fitting opening 37 is located at the end of casing 35 for attachment to one of the relatively movable members to be damped. The other movable member is attached to fitting opening 38 in a lug 39 which is threaded into the end of the shaft 32. An enlarged head 40 is secured to the end of rod 32 and has angular surfaces 40a and 40b which move through the medium 13 and cooperate with the casing section 35b to provide a variable area orifice 41. The pressure of the medium 13 can be increased by threading the gland 34 into the casing 35, and an extension 40 in gland 34 provides a stop for head 40. Because of the shape of the head 40 and the presence of orifice 41, other damping forces in addition to those considered in FIGURE 3 are brought into effect. In other words, the same types of damping forces are available as in FIGURE 6 and in addition, a spring force resulting from compression of the solid acts on the differential area of head 40.

Therefore, by the addition of the shaped head 40 to a device such as shown in FIGURE 3, additional damping forces can be applied to a damped spring in addition to those obtained from a uniform diameter rod, and these additional damping forces are of the same type as discussed in connection with the simple damping device of FIGURE 2a. Of course, the magnitude of the damping forces would be different in the device of FIGURE 8, since the internal pressure of medium 13 increases as the rod extends into the medium, whereas in FIGURE 2a the internal pressure throughout the medium remains approximately constant. It is apparent that the device of FIGURE 8 will operate as a spring if the spring return force is greater than the static forces resulting from the damping action. If the damping static forces are greater than the spring action, then the device will be in the nature of a true damper. Thus, the device of FIGURE 8 can also be a combination spring and damper wherein the spring action produces only a partial return after which time the damping forces overcome the spring return forces. Whether the device of FIGURE 8 acts as a damped spring or simply as a damper or a combination of the two is determined by the following characteristics: compressibility, shear strength and volume of the compressible solid; area of the piston rod and head; stroke of the piston, area of the annulus or orifice between the piston head and the cylinder inside diameter, and static pressure of the compressed solid.

The device of FIGURE 8 has a large number of advantages over similar devices, such as liquid springs, air springs, metallic springs, hydraulic dampers, oleo-pneumatic damped springs and friction dampers. For instance, a large range of spring and damper characteristics are available through changing the variables set forth above. In addition, as with the pure damper of FIGURE 6, leakage problems are substantially reduced since it is only necessary for the sealing rings to prevent extrusion of the compressible solid. Thus, the service problems are greatly reduced. Finally, the wall stresses in the cylinder 35 are reduced over those of liquid and gas devices, since the compressible solid carries a portion of the hoop tension load which is therefore not transmitted to the cylinder itself. As stated above, the device has the advantage that finite force is required to produce movement of the piston head and any combination of spring force and damper force can be produced in order to provide any degree of partial return desired.

Another form of damped spring is illustrated in FIGURE 10. In this embodiment of the invention, the casing 45 has a threaded end 45a which receives a gland 46, similar in construction to glands 22 and 36 in that it has sealing rings 47 and 48 for preventing extrusion around the gland, and the gland can be tightened into the casing 45 to increase the pressure of the compressible solid 13. A piston rod 49 has an enlarged head 50 and a first portion 49a of the rod extends through an opening in the gland 46. A stud 51 is secured to rod portion 49a and has an opening 52 to provide for attachment to one of two relatively movable members. The portion 49b of the rod 49 extends into casing extension 45b and a sealing ring 53 prevents extrusion of the solid into the extension. The end of the extension has an attachment opening 53 for connection to the other of two relatively movable members. The cylinder 45 has a surface 54 and the gland 46 has an extension 55 having a surface 56 and these surfaces serve as limit stops for the rod 49 by engaging the head 50. Since the diameter of shaft portion 49b is larger than that of portion 49a, it is apparent that as the head moves to the left in FIGURE 10, the volume of the compressible solid 13 will be reduced and its pressure will increase. At the same time, a frictional or shearing damping force will become effective upon the portion 49b and this damping force will increase as the piston head 50 moves to the left since the affected area of the rod increases and the internal pressure increases. Also, during the movement to the left, the frictional or shearing force on the smaller portion 49a will vary because the affected area decreases but is subject to a high pressure of the medium. In addition, as the piston head 50 moves to the left, a variable area orifice is present between the head 50 and the contoured section of the cylinder 45 formed by sections 45c and 45d which increase in diameter to point 45e. Because of the decrease in volume of the compressible solid as the piston head 50 moves to the left, a spring action is produced because of the increased pressure acting on the differential area of the head 50. In other words, the surface 50b of head 50 presents a greater projected area than the surface 50a, and therefore, the resultant spring force will be in a direction to move the piston 50 to the right and return it to its home position. Obviously, the same type of damping and spring forces are present in the device of FIGURE 10 as in the device of FIGURE 8 although their forces may have a different relationship in their magnitude.

It is therefore obvious that the present invention provides a novel type of damper and damped spring which utilizes a compressible solid as the working medium. In both the damper and the damped spring, it is possible to obtain a wide variety of different types of damping more simply with the compressible solids, and these various types of damping can be frictional damping which is independent of velocity, viscous damping which is proportional to velocity, and exponential velocity damping which is proportional to some exponential power of velocity. In both the damper and the spring, various combinations of these types of damping forces are available. In addition, because of the shear strength of the material, a piston having an orifice produces a differential pressure by moving through the medium, which differential pressure opposes movement of the piston. Also, in both the damper and damped spring, an initial finite force is required to move the rod because of the continual presence of damping forces against the rod, and in both forms, the sealing problem is greatly reduced because it is only necessary to seal against extrusion of the compressible solid. In the form of the invention related to the damped spring, a combination spring and damper is provided in which any desired amount of partial return can be accomplished. It is contemplated that all of the variables affecting the damping characteristics of the device can be changed in any suitable manner to obtain the type of damping required for any particular installation, and to obtain the amount of return and spring force which is desired. It is also contemplated that various compressible solids can be utilized in various other well known types of structures, in addition to those illustrated herein. Various other modifications are contemplated by those skilled in the art without departing from the spirit and scope of the invention as hereinafter defined by the appended claims.

What is claimed is:

1. A damper comprising a closed chamber, a piston rod of uniform cross-sectional area extending through said chamber, an enlarged piston head on said rod, a space between the interior surface of said chamber and the edge of said piston head defining an orifice, a compressible solid comprising a unitary homogeneous mass under pressure and located within said chamber for producing a damping force on said rod and piston head, and means for varying the pressure of the compressible solid in said chamber within the pressure range required to produce frictional or shear damping on said rod, said chamber having a cross section of varying diameter so that the space between the interior of said chamber and the edge of said piston head defines an orifice for plastic flow of said solid of variable area depending upon the position of said piston head.

2. In combination, a closed chamber of fixed volume, a piston rod extending into said chamber through one side thereof, an enlarged piston head secured to said rod and spaced from the interior of said chamber to define an orifice between the interior of said chamber and the edge of said piston head, a compressible solid surrounding said rod and head and filling said chamber for producing a damping and spring force on said rod and head as said rod moves into said chamber and reduces the volume of the solid in the chamber, and means for varying the pressure of the solid material which is in the chamber for varying the initial pressure thereof to select the initial spring force and to select the initial type of damping on said rod.

3. A damped spring comprising a closed chamber, a piston rod extending into said chamber through one side thereof, an enlarged piston head on said rod and spaced from the interior of said chamber to define an orifice between the interior of said chamber and the edge of said piston head, a compressible solid surrounding said rod and head and filling said chamber for producing a damping and spring force, and means for varying the initial pressure of the compressible solid to select the initial spring force and to select the initial type of damping on said rod, said chamber having a section of varying diameter so that said orifice has an area for plastic flow of said solid varying with the position of said piston head.

4. In combination, a closed chamber of fixed volume, a piston rod extending completely through said chamber and having portions of different diameter, an enlarged piston head on said rod and positioned between said rod portions, said head being spaced from the interior of said chamber to define an orifice between the interior of said chamber and the edge of said piston head, compressible solid surrounding said rod and head and filling said chamber for providing a damping and spring force upon movement of the larger rod portion into any solid surrounding said rod and head, and means operative on solid in the chamber for varying the initial pressure of the solid which is in the chamber to select the initial spring force and to select the initial type of damping force on said rod.

5. A damped spring comprising a closed chamber, a piston rod extending completely through said chamber and having portions of different diameter, an enlarged piston head on said rod and positioned between said rod portions, said head being spaced from the interior of said chamber to define an orifice between the interior of said chamber and the edge of said piston head, a compressible solid surrounding said rod and head and filling said chamber for providing a damping and spring force, and means for varying the initial pressure of the compressible solid to select the initial spring force and to select the initial type of damping force on said rod, said chamber having a section of varying diameter so that said orifice has an area for plastic flow of said solid varying with the position of said piston head.

References Cited in the file of this patent

UNITED STATES PATENTS

| | | |
|---|---|---|
| 731,116 | Myer | June 16, 1903 |
| 2,263,599 | Tucker | Nov. 25, 1941 |
| 2,460,116 | Bazley | Jan. 25, 1949 |
| 2,570,854 | Pierce | Oct. 9, 1951 |
| 2,808,074 | Kronoff et al. | Oct. 1, 1957 |
| 2,846,211 | Taylor | Aug. 5, 1958 |

FOREIGN PATENTS

| | | |
|---|---|---|
| 19,344 | Great Britain | of 1912 |
| 44,909 | Norway | Feb. 27, 1928 |
| 1,054,004 | France | Oct. 7, 1953 |
| 516,116 | Canada | Aug. 30, 1955 |